United States Patent [19]

Matsumura et al.

[11] Patent Number: 4,908,038
[45] Date of Patent: Mar. 13, 1990

[54] HIGH-SECURITY INTEGRATED-CIRCUIT CARD

[75] Inventors: Hidekazu Matsumura, Okegawa; Yoshikazu Yorimoto, Tokyo, both of Japan

[73] Assignee: Toppan Printing Co., Ltd, Tokyo, Japan

[21] Appl. No.: 263,267

[22] Filed: Oct. 27, 1988

[30] Foreign Application Priority Data

Oct. 29, 1987 [JP] Japan .................. 62-273866

[51] Int. Cl.$^4$ ............................................. G06F 9/00
[52] U.S. Cl. .................................. 902/5; 235/379; 235/375; 235/380; 364/900; 364/969.4
[58] Field of Search ........... 364/200, 900; 235/379, 235/380; 902/5, 1

[56] References Cited

U.S. PATENT DOCUMENTS

| | | | |
|---|---|---|---|
| 4,214,230 | 7/1980 | Fak et al. | 902/5 |
| 4,224,666 | 9/1980 | Giraud | 902/5 |
| 4,630,201 | 12/1986 | White | 235/379 |
| 4,642,631 | 2/1987 | Rak | 902/5 |
| 4,650,975 | 3/1987 | Kitchener | 902/5 |
| 4,650,980 | 3/1987 | Mizutani | 902/5 |
| 4,709,137 | 11/1987 | Yoshida | 235/379 |

Primary Examiner—Gareth D. Shaw
Assistant Examiner—John G. Mills
Attorney, Agent, or Firm—Bacon & Thomas

[57] ABSTRACT

An integrated circuit card having a one-chip micro computer, a memory, and an address bus and data bus for coupling the micro computer and the memory, includes an input/output bus and interface for communication with an external terminal device. The micro computer executes processing commands from the external device, and returns the processing results to the external device through the interface. Instead of returning the processing results to the micro computer immediately when processing is finished, the IC card includes a timer for measuring elapsed time starting with the receipt of a processing command. The processing results are returned to the external device only when a predetermined elapsed time has been measured by the timer. Therefore, the return of the processing results, (for example, the determination as to whether a PIN is correct) is not dependent upon the processing time, making it impossible for a user of the external device to determine the type of processing command and the results of the processing based on the processing time.

8 Claims, 5 Drawing Sheets

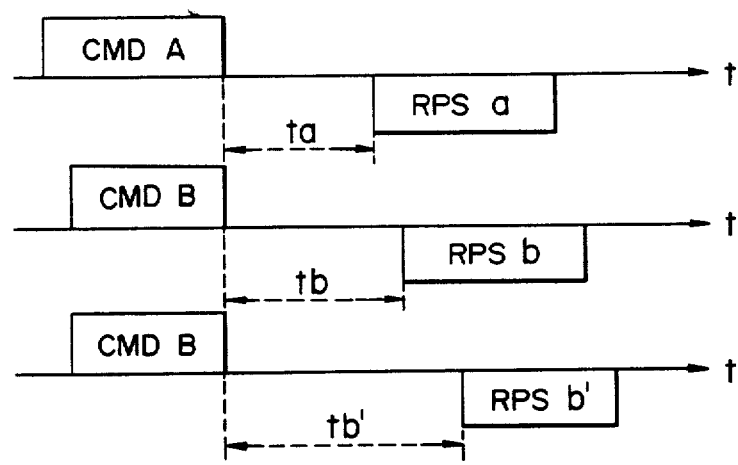
F I G. 1
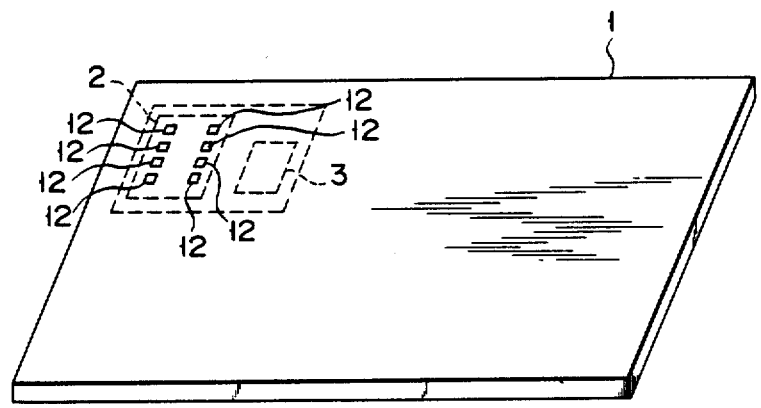
F I G. 2

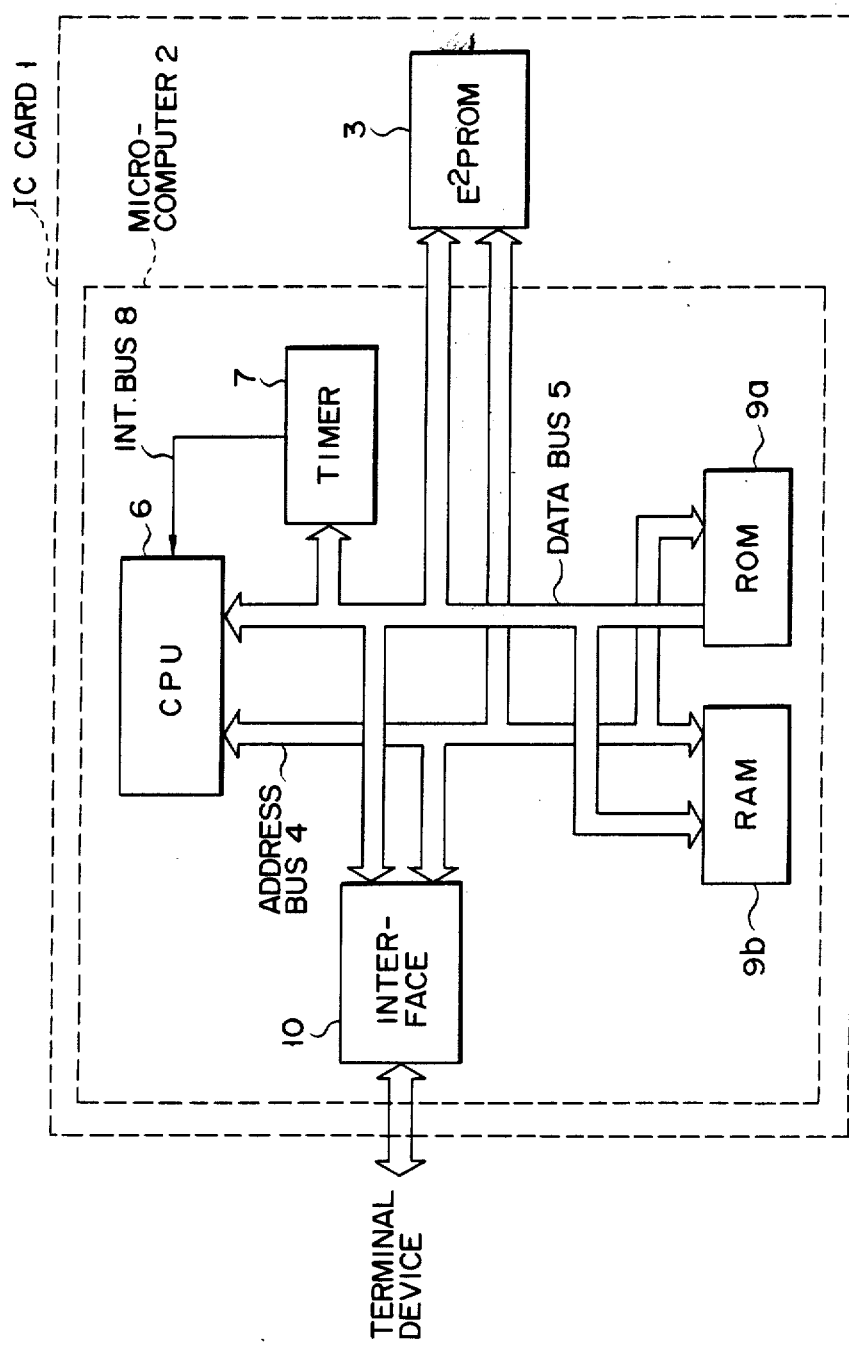
F I G. 3

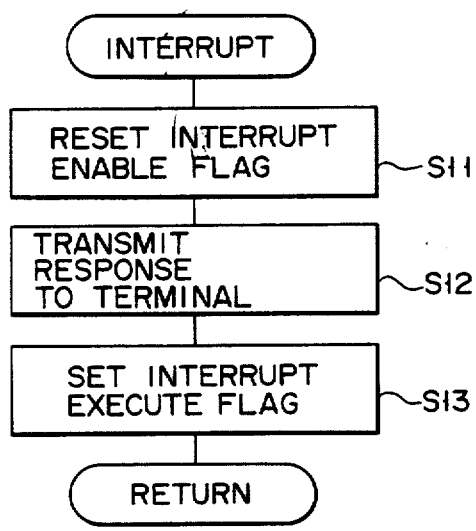
F I G. 6
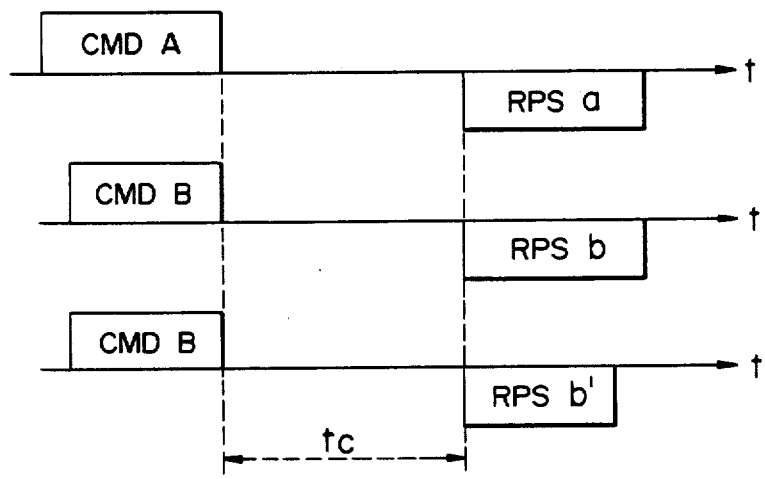
F I G. 7

HIGH-SECURITY INTEGRATED-CIRCUIT CARD

BACKGROUND OF THE INVENTION

1. Field of the Invention

The present invention relates to an integrated-circuit (IC) card which has an electronic circuit including a microcomputer, memory, etc. within a card type or package type body.

2. Description of the Related Art

Magnetic recording mediums such as floppy disks and cassette tapes have been widely used as an external memory device for a computer or an electronic device using a computer. From a view point of easy handling and compactness, however, IC cards having a semiconductor memory, such as an $E^2$PROM, EPROM or battery-backup type RAM, within a card or package type body have recently become popular. In the field of credit cards, ID cards and bank cards, so-called IC cards with a microcomputer and a memory such as an $E^2$PROM or EPROM installed therein are now considered as replacements for magnetic cards, due to their larger memory capacity and higher security.

An IC card is designed such that it receives data from an external terminal device through its terminals provided on the surface, processes the data, stores it in a memory if needed, and returns the processing result to the terminal device. An example of data processing executed in the IC card is a personal identification number (PIN) verification, which is done prior to the actual use of an IC card in order to confirm whether or not the person who actually uses the card is the rightful owner of the card. Generally, a four-digit personal identification number is stored in advance for each IC card and a user enters the number to a terminal device. The PIN entered into the terminal device is transferred to the IC card for comparison with the correct card-owner's PIN stored in advance in the card, and the verification result is sent to the terminal device from the card. Here, the verification result only indicates that the entered PIN is either correct or not. In general, when an incorrect digit is found during a digit by digit verification, the verification is stopped and no further verification is executed, and a signal representing the negative result is returned to the terminal device. In other words, when such a signal is returned, it is understood that the previous digit or digits are correct. Even if the user does not known the correct PIN, therefore, he may find out the correct PIN through try and error, i.e., repeatedly entering different PINs. In other words, the processing time from the point at which an processing command is received by the IC card to the point at which its processing result is returned to the terminal device (i.e., processing time of the IC card) differs depending on the result of processing the command, i.e., on which digit of the PIN is detected as false. The processing time also naturally differs for different processing commands.

According to a conventional IC card, as shown in FIG. 1, the processing time takes different values $t_a$ and $t_b$ for different types of processing commands (CMD A and CMD B). Even if the same command (CMD B) i.e., the PIN verification command in the above example, is input to the IC card, the processing time may take different values, $t_b$ and $t_b'$, depending on the processing result (RES b or RES b') i.e., the digit to be found false. This is because, immediately upon completion of data processing, the processing result is returned to the terminal device.

Accordingly, albeit in very limited cases, those who are involved in developing an IC card or a system utilizing an IC card, or who have use the card to input processing commands through a terminal device, can find out the processing result or the processing commands by measuring the processing time. As a result if communicated between the IC card and terminal device is encrypted, the encryption algorithm can be determined, thus enabling unauthorized use of the IC card.

Further, during the period from a time at which a processing command is sent to an IC card until a time at which a processing result from the card, the terminal device of the conventional IC card system must wait for the processing result from the card and cannot do other processing, thus significantly reducing the system's operational efficiency. This is because the terminal device must wait until the processing result is sent back from the card, and this may occur at any time.

SUMMARY OF THE INVENTION

Accordingly, it is an object of this invention to provide a high-security IC card which can surely prevent its unauthorized use.

It is another object of this invention to provide an IC card which can improve the operational efficiency of a system utilizing the IC card.

An IC card according to this invention returns a processing result to an external device when a given time elapses after reception of a processing command from the external device, irrespective of the type of the command the contents of the processing result thereby preventing the processing result and/or the processing command from being found out by measuring the processing time. Further, the external device need not always wait for a response from the IC card and can do other processing during the given time period after transmission of the processing command, thus improving the operational efficiency of a system using the IC card.

BRIEF DESCRIPTION OF THE DRAWINGS

FIG. 1 is a time chart illustrating processing times for a conventional IC card;

FIG. 2 is a perspective view illustrating the outline of an IC card according to one embodiment of this invention;

FIG. 3 is a block diagram of the IC card according to this embodiment;

FIG. 6 is a flowchart of an interrupt routine; and

FIG. 7 is a time chart illustrating processing times for the IC card according to this embodiment.

DETAILED DESCRIPTION OF THE PREFERRED EMBODIMENT

Figure 4:
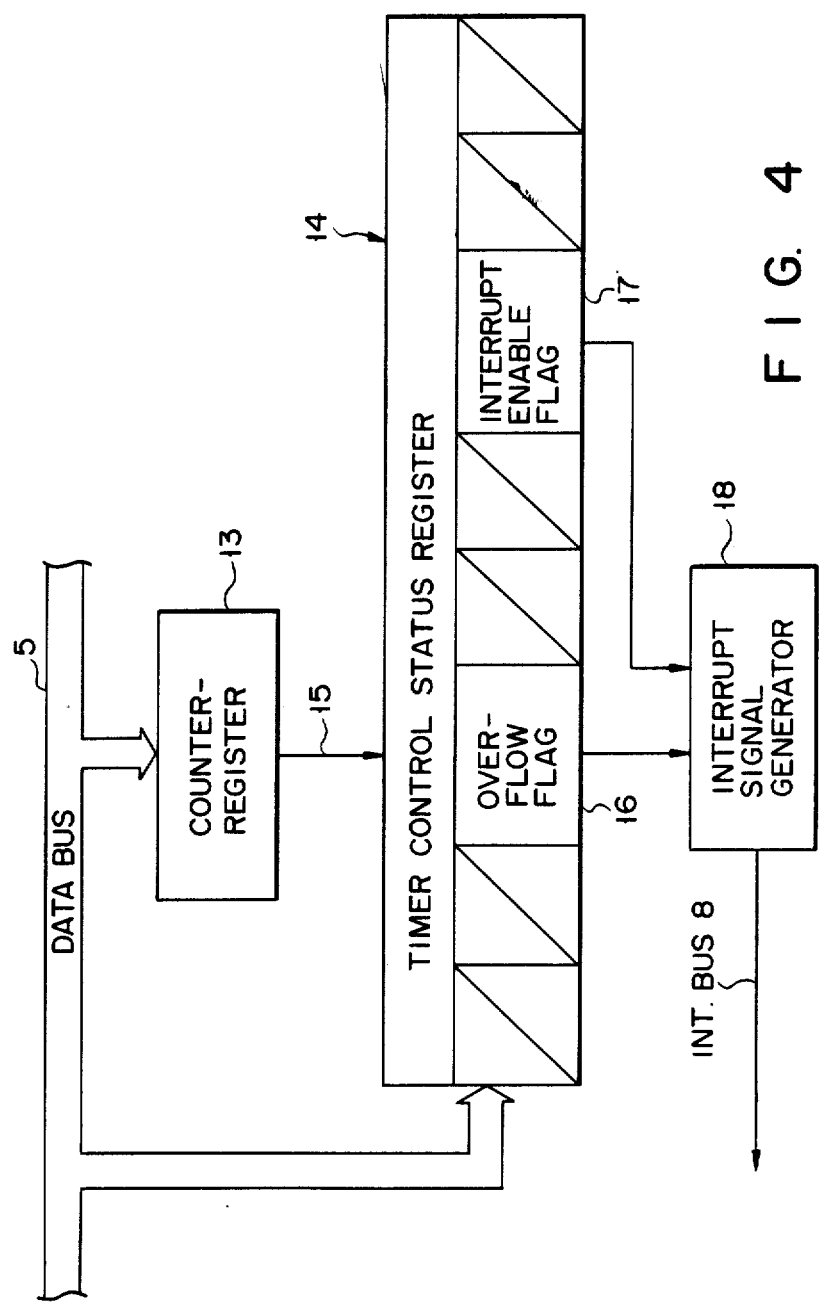
FIG. 4 is a block diagram illustrating the internal structure of a timer.

FIG. 2 is a perspective view of the outline of an IC card. An IC card 1 has a one-chip microcomputer 2 and a memory ($E^2$PROM or EPROM) 3 built into its card-shaped body. Microcomputer 2 has a plurality of terminals 12 through which it exchanges the necessary data with an external terminal device (not shown), executes data processing and writes data in memory 3. The terminal device is further coupled to a host computer.

FIG. 3 is a block diagram illustrating the circuit arrangement of IC card 1. Microcomputer 2 and memory 3 are coupled together through an address bus 4 and data bus 5. Within microcomputer 2, a CPU 6 is coupled to a timer 7 through the data bus 5 and an internal interrupt signal bus 8. Internal memories ROM 9a and RAM 9b of microcomputer 2 are coupled through address bus 4 and data bus 5 to an interface 10 for communication with the terminal device.

FIG. 4 is a block diagram of timer 7 in microcomputer 2. A counter-register 13 is coupled through data bus 5 to CPU 6, and it is always functioning to increment its count value by one for every given period while CPU 6 is functioning. The counter-register 13 is coupled through an overflow signal bus 15 to a timer control status register 14, which is also coupled to CPU 6 through data bus 5.

Register 14 stores in total eight flags, one for each bit. Here, only an overflow flag 16 and an interrupt enable flag 17 are illustrated, and the other flags are omitted as they are not associated with the operation of this embodiment. The overflow flag 16 is set by a signal supplied from counter-register 13 through overflow signal bus 15 when an overflow occurs in the register 13, and is reset by a signal supplied from CPU 6 through data bus 5 at a given timing. Interrupt enable flag 17 indicates the enable/disable of an internal interrupt of CPU 6, and it is set or reset by a signal supplied from CPU 6 through data bus 5 at a given timing.

Data of overflow flag 16 and interrupt enable flag 17 are both input to an interrupt signal generator 18, which sends an internal interrupt signal to CPU 6 through internal interrupt signal bus 8 to cause an internal interrupt when both flags are set.

Figure 5:
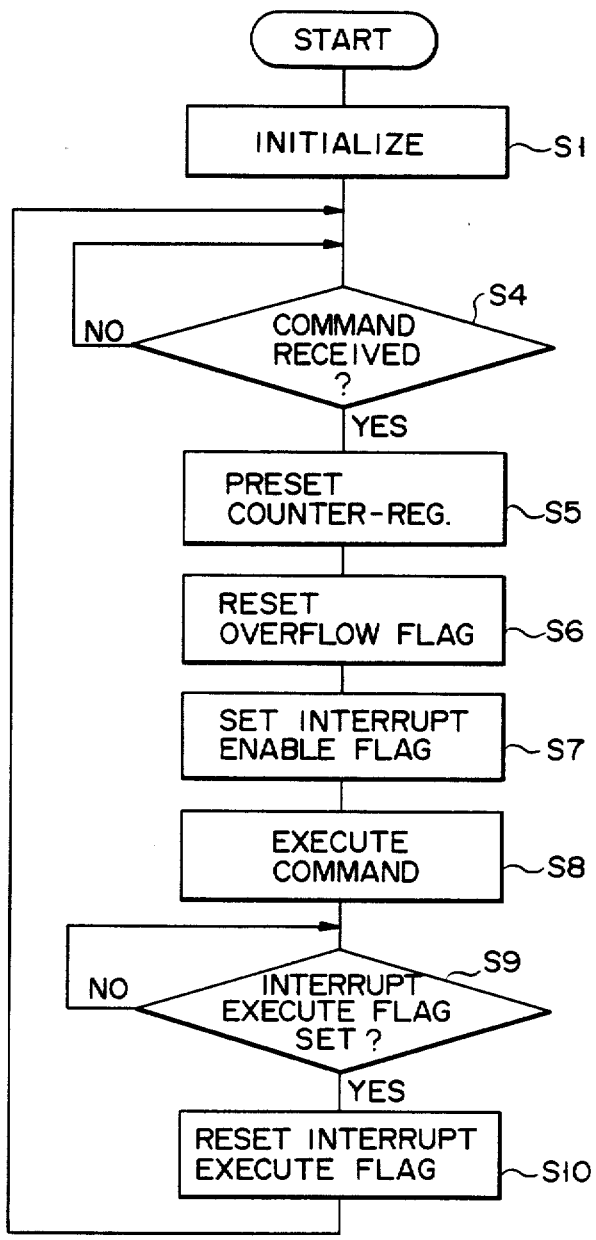
FIG. 5 is a flowchart illustrating the operation of a central processing unit (CPU)

Referring now to FIGS. 5 and 6, the operation of the IC card will be described. FIG. 5 is a flowchart for the operation of CPU 6.

When IC card 1 is loaded in a card insertion slot of the terminal device and its terminals 12 are coupled to the corresponding terminals of the terminal device, CPU 6 is given power from the terminal device and starts functioning.

In step S1, CPU 6 receives a reset signal from the terminal device to be initialized and executes the pre-processing for data communication or initialization of the transmission speed, transmission format, guard time, block size or the like.

In step S4, CPU 6 detects whether or not it has received a processing command from the terminal device and waits until it receives the command.

Upon receiving a complete processing command, CPU 6 sets a predetermined initial value in counter-register 13 through data bus 5 in step S5. This initial value is determined in such a way that the time for counter-register 13 to up-count until an overflow occurs is longer than the longest processing time each processing command can have. That is, an initial value is set which generates no internal interrupts before the execution of a processing command requiring the longest processing time is completed.

In step S6, overflow flag 16 is reset, and in step S7, interrupt enable flag 17 is set. In this manner, generation of an internal interrupt becomes ready through steps S5 to S7. Then, the processing command received in step S4 is executed in step S8.

After the execution of the processing command is completed, CPU 6 detects in step S9 whether or not an internal interrupt execute flag is set, and waits until the flag is set. The interrupt execute flag indicates whether or not an internal interrupt has been generated and an interrupt routine has been executed, and this flag is set in RAM 9b of microcomputer 2, not in timer control status register 14.

Since, as described above, the initial value for counter-register 13 is determined such that an internal interrupt occurs after the execution of the processing command requiring the longest processing time is completed, this processing is always completed before occurrence of an internal interrupt. Accordingly, the processing should end and an overflow should occur in counter-register 13 before the setting of the interrupt execute flag is detected in step S9.

When an overflow occurs in counter-register 13, overflow flag 16 in timer control status register 14 is set by a signal from counter-register 13 through overflow signal bus 15. Since interrupt enable flag 17 has already set in step S7, interrupt signal generator 18 generates an internal interrupt signal to CPU 6 through internal interrupt signal bus 8. Upon reception of this signal, CPU 6 executes an interrupt routine as shown in FIG. 6.

In this interrupt routine, interrupt enable flag 17 is reset in step S11 in order to inhibit the occurrence of a further interrupt until CPU 6 receives the next processing command from the terminal device.

In step S12, the processing result is returned to the terminal device.

In step S13, the interrupt execute flag in RAM 9b is set to indicate that the interrupt routine has been executed. Then, the flow returns to the original routine (step S9 in FIG. 5).

When CPU 6 detects in step S9 the interrupt execute flag being set, it resets the interrupt execute flag in step S10 to be ready for the next processing command and returns to step S4 to wait for a new processing command.

By repeating the same operation for the next processing command starting with step S4, it is possible to always make constant the processing time between the point at which the IC card 1 receives a complete processing command from the terminal device and the point at which the card begins returning the processing result to the terminal device, irrespective of the processing result and processing command.

FIG. 7 is a time chart illustrating the processing times for the IC card of this embodiment. It should be noted that the processing time $t_c$ is constant irrespective of the processing command (CMD A or CMD B) or irrespective of the processing result (RES b or RES b') for the same processing command (CMD B).

As described above, of the IC card according to this embodiment, communicating with the terminal device by encrypting data, always returns the processing result in a constant time period. Therefore, even if the processing time is measured by monitoring a serial I/O line in the system using the IC card of this embodiment, it is impossible to find out a processing command and/or processing result since the processing time is constant irrespective of the type of the processing command and/or the contents of the processing result. This makes it impossible to find out a PIN through trial and error, which could be done in the prior art.

Since the processing time for IC card 1 is made constant, a terminal device can execute other processing or send a processing command to another IC card during this constant time between the transmission of a processing command to IC card 1 and reception of the processing result therefrom. This can improve the operational efficiency of a system using this IC card and can reduce the processing load of the terminal device as a consequence.

Needless to say, this invention is in no way limited to the above particular embodiment, but can be modified in various manners within the scope and spirit of the invention. For instance, although the processing time is made constant, it need not be constant for every processing command. Different constant processing times may be set for individual processing commands. Further, the above processing, i.e., making the processing time constant, should not necessarily be done for every command. For instance, in a case where a processing command is unlikely to be found out from the processing time and it is sufficient to prevent only the discovery of the processing result from the processing time (such as discovery of the PIN verification), the processing time could be made constant only for that specific processing command and the processing results for other processing commands may be returned to the terminal device immediately after the commands are executed. The flowchart for CPU 6 in that case should include a step for discriminating the type of a received command after step S4 in FIG. 5 and the flowchart of FIG. 5 should be executed only for a specific command.

Although according to the above embodiment, an interrupt is given to the CPU upon elapse of a given time after the IC card receives a processing command and the processing result is returned to the terminal device after a given, constant time with the help of the timer built in the microcomputer, this may be done using software. For example, the PIN verification can be executed as follows. It is assumed that the PIN has four digits and a time required to verify each digit of the PIn is a given period. If it is found that one of the first, second, and third digits is incorrect, the verification result is returned to the terminal device after the time delay routine corresponding to the incorrect digit is executed. In other word, when the first digit is found to be incorrect, the NOP (no operation) instructions are executed a given number of times or a count-up operation is executed to a given count for producing a time period in which three digits are verified, upon which the verification result is returned.

As explained above, according to this invention, the processing time between the reception of a complete processing command and the beginning of the returning of the processing result is made constant. It is therefore possible to provide a high-security IC card which can surely prevent an unauthorized use of an IC card and improve the operational efficiency of a system suing this IC card.

What is claimed is:

1. An high security integrated-circuit card having a micro computer for executing a processing command received from an external device and returning a processing result to said external device, said integrated-circuit card comprising:
    timer means for measuring elapsed time after reception of a processing command from said external device, and generating an output signal when the measured time reaches a predetermined value; and
    return means for returning said processing result to said external device in response to said output signal, whereby said processing result is returned to said external device in response to the elapsed time measured by said timer means having reached a predetermined value irrespective of the actual processing time required to obtain said processing result.

2. An integrated-circuit card as claimed in claim 1, wherein said predetermined value is a constant value irrespective of the type of processing command received from said external device.

3. An integrated-circuit card as claimed in claim 1, wherein said predetermined value is predetermined according to the type of processing command.

4. An integrated-circuit card as claimed in claim 3, wherein said timer means starts to measure time only after receipt of a specific type of processing command.

5. An integrated circuit card as claimed in claim 1, wherein said timer means comprises:
    a timer which operates when said micro computer operates, and including means for increasing a count value, the timer being arranged to overflow hen the count value reaches the constant value, an initial value of said timer being set by said micro computer when the micro computer receives a processing command; and wherein said micro computer comprises:
    an overflow flag arranged to be set by said timer when the timer overflows and reset by said micro computer when the micro computer receives the command; and
    wherein said micro computer includes means for resetting the interrupt enable flag once said overflow flag and said interrupt enable flag are both set, thereby initiating return of the processing result to said external device.

6. An integrated-circuit card as claimed in claim 5, wherein said micro computer includes means for presetting a constant value in said timer, irrespective of the type of processing command received.

7. An integrated-circuit card as claimed in claim 5, wherein said micro computer includes means for presetting a variable value predetermined in accordance with the type of processing command.

8. An integrated-circuit card as claimed in claim 7, wherein said preset means presets a predetermined value only when a predetermined type of processing command received.

* * * * *

UNITED STATES PATENT AND TRADEMARK OFFICE
CERTIFICATE OF CORRECTION

PATENT NO.   :   4,908,038
DATED        :   March 13, 1990
INVENTOR(S) :    MATSUMURA et al It is certified that error appears in the above-identified patent and that said Letters Patent is hereby corrected as shown below:

On the title page, please add at [75] the inventor, MASASHI TAKAHASHI, Tokyo, Japan.

Signed and Sealed this

Sixteenth Day of July, 1991

Attest:

HARRY F. MANBECK, JR.

Attesting Officer

Commissioner of Patents and Trademarks